United States Patent [19]

Messmore et al.

[11] Patent Number: 5,039,156
[45] Date of Patent: Aug. 13, 1991

[54] AUTOMOBILE HOOD SHIELD WITH DEFLECTOR

[75] Inventors: Richard G. Messmore, Thousand Oaks; Robert J. Chabot, Simi Valley, both of Calif.

[73] Assignee: Covercraft Industries, Inc., Chatsworth, Calif.

[21] Appl. No.: 365,488

[22] Filed: Jun. 13, 1989

[51] Int. Cl.⁵ .............................................. B60J 1/20
[52] U.S. Cl. ....................................... 296/91; 296/1.1
[58] Field of Search ................. 296/136, 91, 1.1, 152; 150/166; 49/462; 180/69.25; 280/770

[56] References Cited

U.S. PATENT DOCUMENTS

| | | | |
|---|---|---|---|
| 2,184,995 | 12/1939 | Eriksen | 296/91 |
| 2,872,242 | 2/1959 | Whartman | 296/91 |
| 3,022,848 | 2/1962 | Heiser | 296/91 X |
| 3,550,951 | 12/1970 | Cobbs | 296/152 |
| 3,817,572 | 6/1974 | Francis | 296/91 |
| 4,043,587 | 8/1977 | Giallourakis et al. | 296/91 |
| 4,063,773 | 12/1977 | Modesette | 296/91 |
| 4,227,718 | 10/1980 | Durben | 296/1.1 X |
| 4,347,781 | 9/1982 | Hassell | 296/91 X |
| 4,678,118 | 7/1987 | Fukami et al. | 296/91 X |
| 4,776,627 | 10/1988 | Hutto et al. | 296/91 |

OTHER PUBLICATIONS

Bestop Catalog Page, Deflector Shield, p. 27.
Bestop Catalog Page, Performance Deflector Shield, p. 26.

Primary Examiner—Margaret A. Focarino
Assistant Examiner—Joseph D. Pape
Attorney, Agent, or Firm—Spensley Horn Jubas & Lubitz

[57] ABSTRACT

A shield for protecting the windshield and paint finish of the hood of an automobile from impact by insects and debris. The shield has an airfoil to deflect air current carrying debris and insects away from the windshield. The shield also covers the most vulnerable surface of the hood. To facilitate easy installation, the shield may be shaped like a pocket which snugly fits over the front edge of the hood panel.

10 Claims, 2 Drawing Sheets

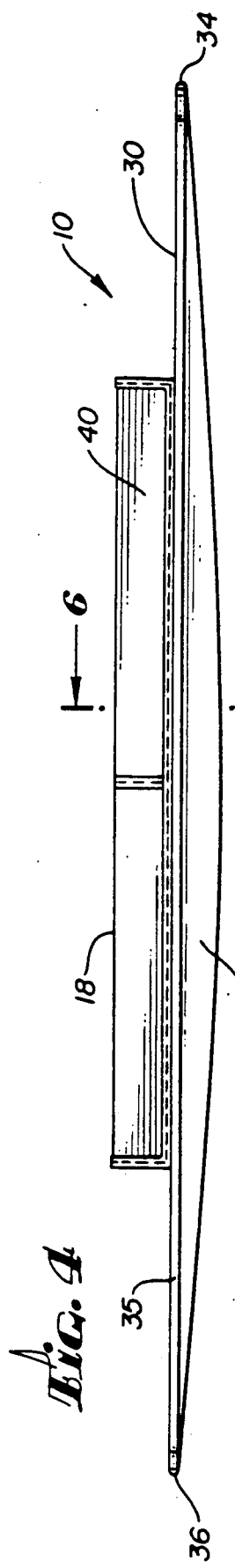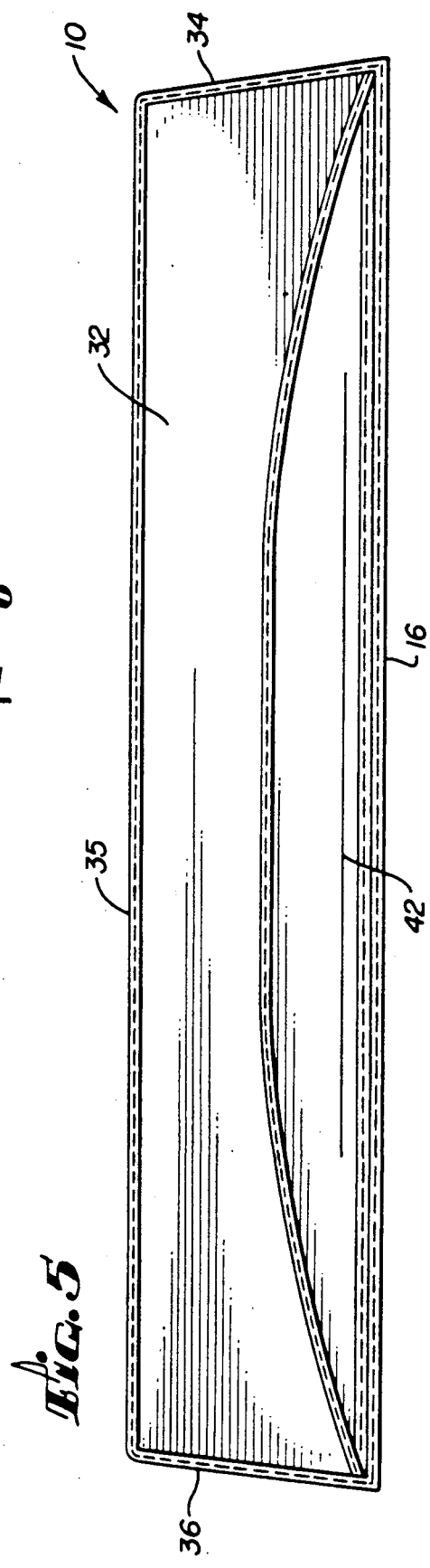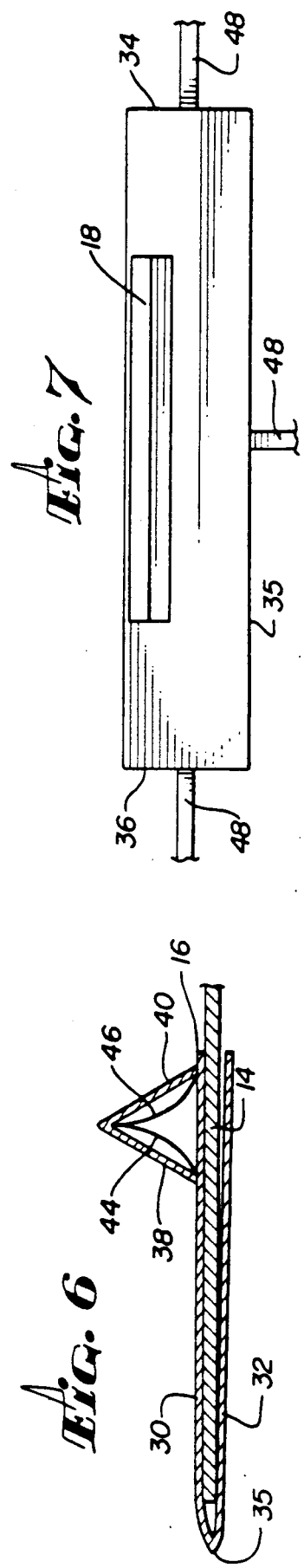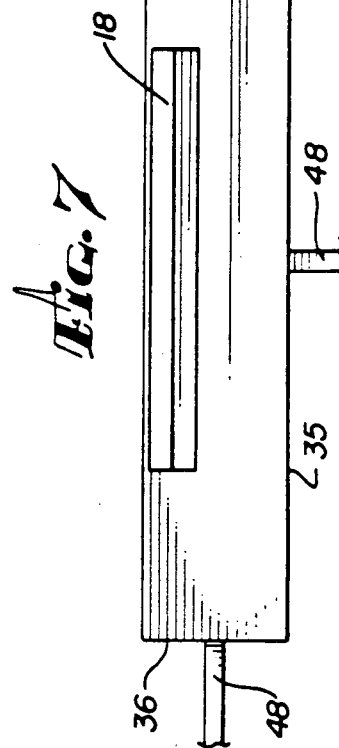

AUTOMOBILE HOOD SHIELD WITH DEFLECTOR

BACKGROUND OF THE INVENTION

1. Field of the Invention

The present invention relates to hood shields for automobiles, and more particularly to shields for protecting hoods and windshields of automobiles from the impact by insects and debris.

2. Description of Related Art

When an automobile travels at highway speed, the frontal surfaces of the automobile are inevitably subject to bombardment of insects and debris. Of particular concern is that the impact of insects and debris may damage the windshield and the paint finish of the hood. Insects splattered on the hood mar the paint finish. More importantly, insects splattered on the windshield reduce the driver's visibility. Moreover, it is not uncommon that windshields are cracked by the impact of debris. These raise safety concerns for highway travellers, not to mention the cost of replacing damaged windshields and hoods.

In the past, a vinyl mask has been used to cover the front section of the hood of an automobile to protect the hood paint finish from damage by insects and debris. Such a mask does not protect the windshield from flying debris.

U.S. Pat. No. 4,776,627 to Hutto describes a plastic wind deflector panel and bug screen combination. The wind deflector is attached to the front edge of the hood and the bug screen hangs below the deflector and in front of the grill. U.S. Pat. No. 2,872,242 to Whartman describes a plastic insect and gravel deflector panel adapted to be mounted to the hood of a vehicle. The above described deflectors are installed on the hood using screw type fasteners. As such, holes are required to be drilled in the hood. This makes it difficult for a person to install the aforementioned deflectors as special tools are required. Moreover, the screw holes are permanent. The holes may be visible on the hood after the deflector has been removed.

SUMMARY OF THE INVENTION

The present invention is directed to a shield which protects the paint finish of the hood and the windshield from impact by debris and insect. The shield may be easily installed on the hood without the use of special tools. The shield covers the most vulnerable portion of the hood and deflects debris and insects away from the windshield.

In one aspect of the invention, the shield is configured in the shape of a pocket which fits snugly over the front edge of the hood panel. The pocket-shaped shield eliminates the need for additional means of securing the shield to the hood.

In another aspect of the present invention, an airfoil is disposed along the trailing edge of the shield. The airfoil deflects air current away from the windshield and towards and over the roof of the automobile. The debris and insects carried by the air current which would otherwise hit the windshield are thus prevented from hitting the windshield. It has been found that the deflector also breaks up the flow of air current towards the windshield thereby to reduce the momentum of the debris. The impact of any debris that reaches the windshield will be substantially reduced.

BRIEF DESCRIPTION OF THE DRAWINGS

FIG. 4 is a front view of the shield of FIG. 3.

FIG. 5 is a bottom view of the shield of FIG. 3.

FIG. 6 is a sectional view of the shield taken along line 6—6 in FIG. 4.

FIG. 7 is a plan view of a second embodiment of a shield according to the invention.

DESCRIPTION OF THE ILLUSTRATED EMBODIMENT

The following description is of the best presently contemplated mode of carrying out the invention. This description is made for the purpose of illustrating the general principles of the invention and should not be taken in a limiting sense. The scope of the invention is best determined by reference to the appended claims.

Figure 2:
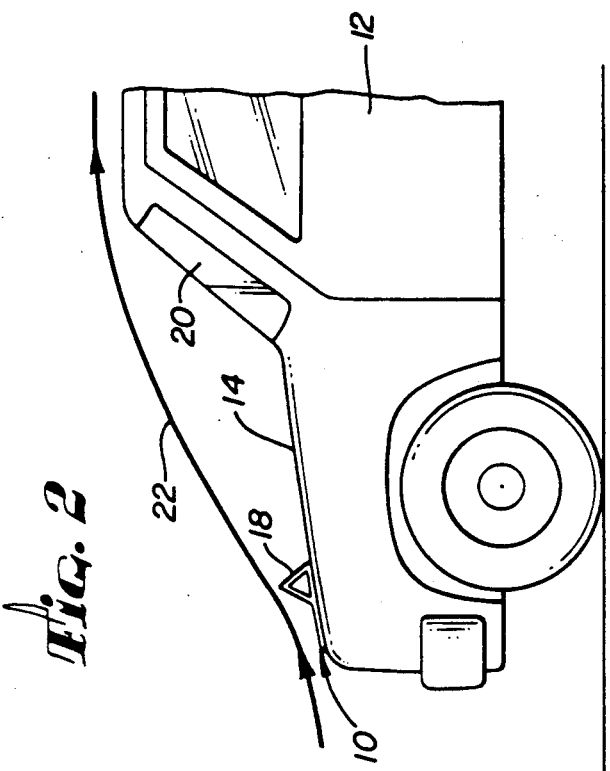
FIG. 2 is a side view of FIG. 1.
Figure 1:
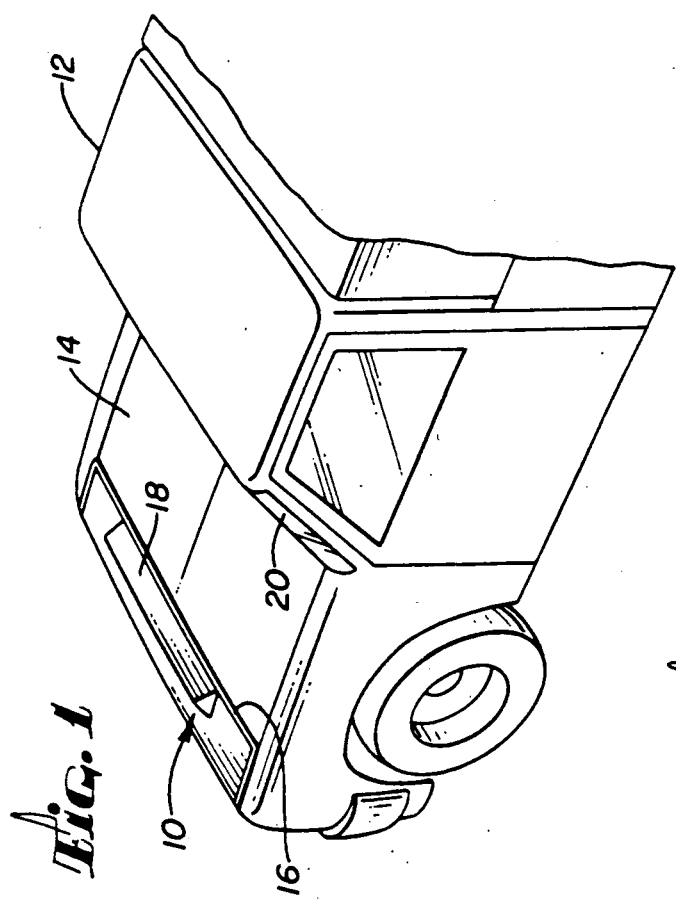
FIG. 1 is a perspective view of a shield in accordance with one embodiment of the present invention, shown installed at the front end of the hood of an automobile.
Figure 3:
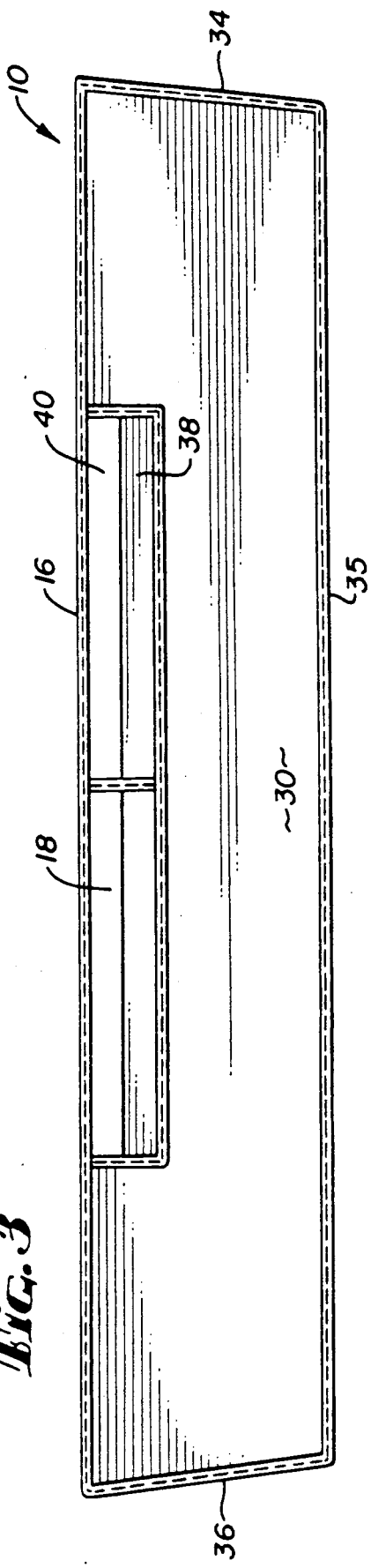
FIG. 3 is a top view of the shield.

Referring to FIG. 1, one embodiment of a shield 10 according to the present invention is shown installed on an automobile 12. The shield covers the front end of the hood 14 of the automobile 12 which is most vulnerable to damage by flying insect and debris. Centered along the trailing edge 16 of the shield 10 is an airfoil 18 of triangular cross-section. As shown in FIG. 2, the airfoil 18 deflects air current 22 away from the windshield 20 of the automobile. It has been found that the airfoil 18 deflects the debris and insects carried in the air current which would otherwise hit the windshield towards and over the roof of the automobile. Also, it has been found that the airfoil breaks up the flow of the air current towards the windshield thereby reducing the momentum of the debris carried with the air current. Consequently, should any debris hit the windshield, the impact is substantially reduced.

In order for the airfoil to effectively protect the entire windshield, it has been found that the span of the airfoil should be more than one-half the width of the hood, preferably two thirds the width of the hood. The optimum span of the air-foil for a particular automobile is dependent on the shape, design and aerodynamics of the hood. This can be readily determined with minimum experimentation. As an example, it has been found that the span of the airfoil of a shield for use on late model full size and "mini" pickup trucks should be at least 46 inches long.

For some models of automobile, especially those that have hoods that open up at the front, as opposed to hoods that open up near the windshield, the shield 10 is made into a pocket which is shaped to custom fit over the front edge of the hood panel 14. Referring to FIGS. 3-6, the pocket-shaped shield 10 has top 30 and bottom 32 pieces sewn along three edges 34, 35 and 36. The legs 38 and 40 of the airfoil 18 are sewn to the vinyl top piece along the trailing edge 16 and line 42. The pocket is custom fitted to the front edge of the hood panel. Alternatively, instead of a pocket configuration, the shield may have a single top piece without the bottom piece, as shown in FIG. 7. This shield is mounted to the front end of the hood using straps 48 or elasticized cords provided along the edges of the shield. The edges are strapped to the underside of the hood, or to the grill and fenders. The advantage of the pocket-shaped shield is that additional means of securing the shield to the hood, such as straps and cords, is not necessary. However, for some models of automobiles, it may be desirable to provide securing straps along the edges 34, 35 and 36 to tie the pocket-shaped shield 10 to the underside of the hood for additional security.

For the above described shield of the present invention, no mounting hardware such as screws, nuts or bolts and no tools are required for installation.

The shield, including the airfoil, is preferably made of durable vinyl material which can withstand the impact of debris and is washable to remove insect bodies splattered on the shield. The vinyl material is provided with a soft flannel backing on the underside facing the painted surface of the hood. The soft backing will not mar the paint finish. Referring to FIG. 6, the vinyl airfoil has a hollow triangular cross-section in which plastic inserts 44 and 46 are used to stiffen the vinyl sides of the triangle.

While the invention has been described with respect to the illustrated embodiments in according therewith, it will be apparent to those skilled in the art that various modifications and improvements may be made without departing from the scope and spirit of the invention. For example, instead of stiffening the hollow airfoil with plastic inserts, it may be filled with foam to stiffen the vinyl material. Accordingly, it is to be understood that the invention is not to be limited by the specific illustrated embodiments, but only by the scope of the appended claims.

I claim:

1. A shield for protecting an automobile hood and windshield from damage by debris, the hood having a front edge, comprising:

a first piece of flexible material shaped to cover a section of the hood which extends rearwardly from the front edge and to rest upon, and conform to the shape of the head, the piece of material having a trailing edge;

an airfoil disposed upon, and along the trailing edge of, the piece of material for deflecting air current away from the windshield, the airfoil being centered within the width of the hood; and having a span extending at least half the width of the hood; and straps depending from the edges of the piece of material for securing the shield to the hood so that the first piece is in contact with, and conforms to the shape of, the hood.

2. A shield as in claim 1 wherein the span of the airfoil is greater than half the width of the hood.

3. A shield as in claim 2 wherein the airfoil has a triangular cross-section.

4. A shield as in claim 1 wherein said first piece of material and said airfoil are each made of a flexible material.

5. A shield as in claim 4 wherein said flexible material is of vinyl.

6. A shield for protecting an automobile hood and windshield from damage by debris, the hood having a front edge, comprising:

a first piece of material shaped to cover a section of the hood which extends rearwardly from the front edge and to rest upon the hood, the piece of material having four edges one of which is a trailing edge;

an airfoil disposed upon and along the trailing edge of the piece of material for deflecting air current away from the windshield, the airfoil being centered within the width of the hood and having a span extending at least half the width of the hood; and a second piece of material joined to the first piece along three edges of the first piece excluding the trailing edge to form a pocket to snugly fit over the front edge of the hood.

7. A shield as in claim 6 wherein the span of the airfoil is greater than half the width of the hood.

8. A shield as in claim 7 wherein the airfoil has a triangular cross-section.

9. A shield as in claim 6 wherein said first and second pieces of material are each made of a flexible material.

10. A shield as in claim 9 wherein said flexible material is of vinyl.

* * * * *

UNITED STATES PATENT AND TRADEMARK OFFICE
CERTIFICATE OF CORRECTION

PATENT NO.  : 5,039,156
DATED       : August 13, 1991
INVENTOR(S) : Messmore, et al.

It is certified that error appears in the above-identified patent and that said Letters Patent is hereby corrected as shown below:

IN THE CLAIMS:

Claim 1, column 3, line 37, after "shape of the", delete "head" and insert --hood--.

Signed and Sealed this

Twenty-fourth Day of August, 1993

Attest:

BRUCE LEHMAN

Attesting Officer

Commissioner of Patents and Trademarks

REEXAMINATION CERTIFICATE (2908th)
United States Patent [19]
Messmore et al.

[11] B1 5,039,156
[45] Certificate Issued Jun. 11, 1996

[54] AUTOMOBILE HOOD SHIELD WITH DEFLECTOR

[75] Inventors: Richard G. Messmore, Thousand Oaks; Robert J. Chabot, Simi Valley, both of Calif.

[73] Assignee: Covercraft Industries, Inc., Chatsworth, Calif.

Reexamination Request:
No. 90/003,850, May 31, 1995

Reexamination Certificate for:
Patent No.: 5,039,156
Issued: Aug. 13, 1991
Appl. No.: 365,488
Filed: Jun. 13, 1989

Certificate of Correction issued Aug. 24, 1993.

[51] Int. Cl.$^6$ .................................................. B60J 1/20
[52] U.S. Cl. .................................................. 296/91; 296/1.1
[58] Field of Search .................................. 296/136, 91, 1.1; 150/166; 280/770

[56] References Cited

PUBLICATIONS

P. 6 from the 1980 Covercraft Catalog.
Feb. 1, 1988 Perfect Fit newsletter, Issue No. 2.
1988 Perfect Fit brochure, entitled "Gone To Pieces!".
Colgan Custom brochure "The original car bra ... Colgan", undated (post-1961).

Colgan Custom brochure "Buyer's Guide to Vehicle Bras", undated (post-1961).

Spires Subaru card "Great Looks and Protection", Oct. 1986.

Patterns By Jay unnumbered catalog pages (2) titled "Car Mask Applications", undated.

Wolf catalog pp. 3, 5 and 6, titled "Specialty Bras", Custom Nose Bras and Easyfit Nose Bras respectively, undated.

Wolf catalog pp. 10, 11 and 12, titled "Nose Bras One-Piece Custom", Nose Bras Two-Piece Custom and Hood Guard respectively, undated.

American Stitchco Inc. brochure "With American Stitchco Skin-Tights, You're Way Out In Front", undated.

*Primary Examiner*—Joseph D. Pape

[57] ABSTRACT

A shield for protecting the windshield and paint finish of the hood of an automobile from impact by insects and debris. The shield has an airfoil to deflect air current carrying debris and insects away from the windshield. The shield also covers the most vulnerable surface of the hood. To facilitate easy installation, the shield may be shaped like a pocket which snugly fits over the front edge of the hood panel.

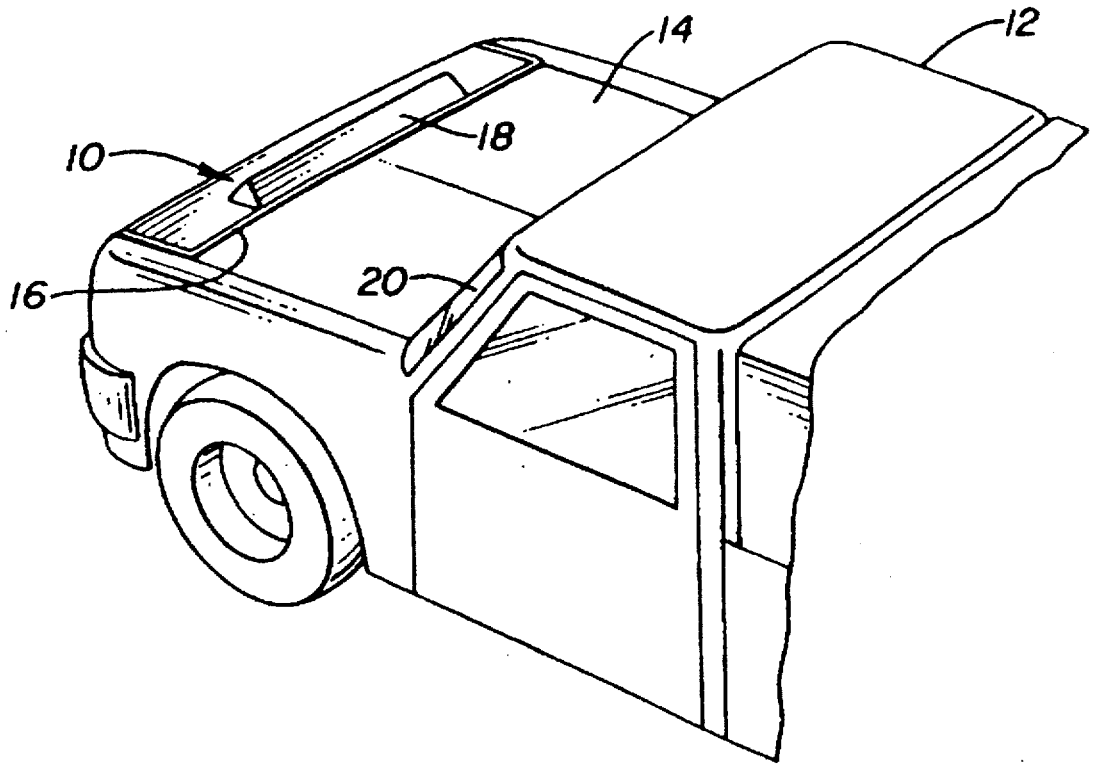

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1–10 are cancelled.

\* \* \* \* \*